US012122535B2

(12) United States Patent
Jones et al.

(10) Patent No.: US 12,122,535 B2
(45) Date of Patent: Oct. 22, 2024

(54) AIRCRAFT TRANSPORT JACK

(71) Applicant: Bell Textron Inc., Fort Worth, TX (US)

(72) Inventors: Alvin Jones, Arlington, TX (US); Vitthal Vishnuthreeth Arakeri, Bangalore (IN); Kevin Knott, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 700 days.

(21) Appl. No.: 17/306,652

(22) Filed: May 3, 2021

(65) Prior Publication Data

US 2022/0297853 A1   Sep. 22, 2022

(30) Foreign Application Priority Data

Mar. 20, 2021   (IN) .............................. 202121011949

(51) Int. Cl.
  *B64F 5/50*   (2017.01)
  *B64C 25/34*   (2006.01)
  *B64C 25/52*   (2006.01)
  *B66F 5/02*   (2006.01)

(52) U.S. Cl.
  CPC ................. *B64F 5/50* (2017.01); *B66F 5/02* (2013.01); *B64C 25/34* (2013.01); *B64C 25/52* (2013.01)

(58) Field of Classification Search
  CPC ...... B64F 5/50; B64F 5/40; B66F 5/02; B66F 3/46; B66F 3/24; B64C 25/34; B64C 25/52; B60P 3/40; B26B 5/0086

USPC ......................................................... 254/2 R
See application file for complete search history.

(56) References Cited

U.S. PATENT DOCUMENTS

| 3,279,722 | A | 10/1966 | Glover et al. |
| 4,223,856 | A | 9/1980 | DiVincenzo |
| 4,600,168 | A * | 7/1986 | Selecman ............... B64C 25/52 |
| | | | 244/50 |
| 4,603,869 | A | 8/1986 | Maxwell |
| 8,196,937 | B2 | 6/2012 | Sahlstorfer |
| 8,292,265 | B2 * | 10/2012 | Benzing ................... E04G 1/24 |
| | | | 254/2 B |
| 8,752,785 | B2 | 6/2014 | Wilson |

* cited by examiner

*Primary Examiner* — Laura C Guidotti
*Assistant Examiner* — Caleb Andrew Holizna
(74) *Attorney, Agent, or Firm* — Bradley Arant Boult Cummings LLP (57) ABSTRACT

An exemplary aircraft transport jack includes a vertical structure having a vertical axis, a bottom end, and a top end, a connector above the bottom end operable to detachably secure the vertical structure to an aircraft member, a wheel assembly with wheels positioned on opposing sides of the vertical structure, and an actuator coupled to the vertical structure and the wheel assembly and operable to move the wheel assembly axially relative to the vertical structure between a lowered position with the wheels on a ground and a raised position with the bottom end on the ground and the wheels above the ground.

9 Claims, 9 Drawing Sheets

AIRCRAFT TRANSPORT JACK

CROSS-REFERENCE TO RELATED APPLICATIONS

This application claims priority from Indian Application No. 202121011949, filed Mar. 20, 2021, the entire contents of which are incorporated by reference in their entirety herein for all purposes.

TECHNICAL FIELD

This disclosure relates in general to the field of aircraft, and more particularly, but not by way of limitation, to a jack stand and ground handling device for aircraft.

BACKGROUND

This section provides background information to facilitate a better understanding of the various aspects of the disclosure. It should be understood that the statements in this section of this document are to be read in this light, and not as admissions of prior art.

Ground handling wheels exist for attachment to an aircraft to maneuver the aircraft while on the ground. These ground handling wheels are often utilized to move the helicopter about the ground. The ground handling wheels are positioned over a skid, attached to the skid, and then the skid can be lifted off the ground with the ground handling wheel assembly.

SUMMARY

An exemplary aircraft transport jack includes a vertical structure having a vertical axis, a bottom end, and a top end, a connector above the bottom end operable to detachably secure the vertical structure to an aircraft member, a wheel assembly with wheels positioned on opposing sides of the vertical structure, and an actuator coupled to the vertical structure and the wheel assembly and operable to move the wheel assembly axially relative to the vertical structure between a lowered position with the wheels on a ground and a raised position with the bottom end on the ground and the wheels above the ground.

An exemplary method for vertically supporting an aircraft on a ground surface, including utilizing a transport jack to support at least a portion of the aircraft above the ground surface, the transport jack comprising a vertical structure having a vertical axis, a wheel assembly with a pair of wheels positioned on opposing sides of the vertical structure, and an actuator coupled to the vertical structure and the wheel assembly and operable to axially move the wheel assembly relative to the vertical structure, securing the vertical structure to the aircraft at an aircraft location positioned above a bottom end of the vertical structure, supporting, in a ground handling wheel position, the aircraft on the wheel assembly with the wheels on the ground surface and the bottom end of the vertical structure above the ground surface, and supporting, in a jack stand position, the aircraft on the vertical structure with the bottom end on the ground surface.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Figure 1:
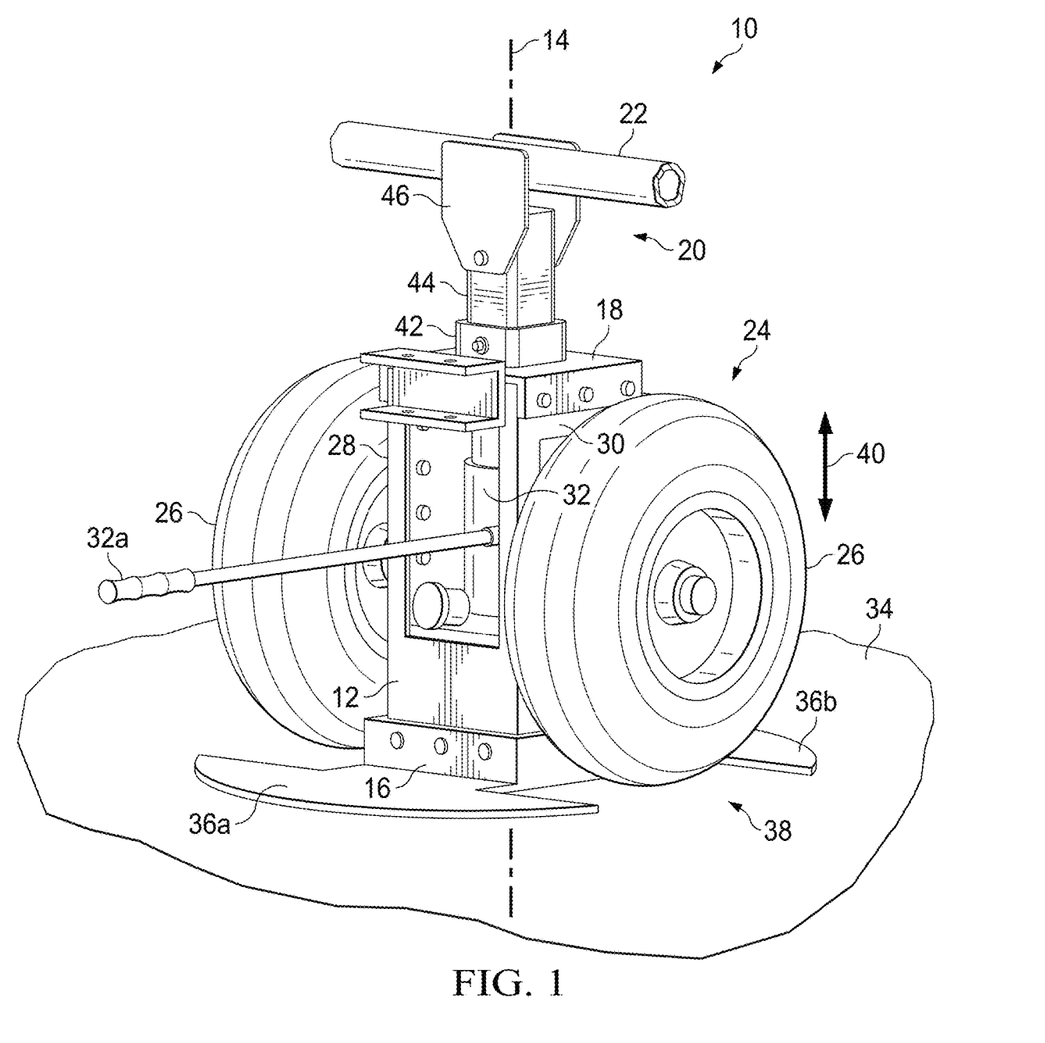
FIG. 1 illustrates an exemplary transport jack operable in a ground handling wheel position and a jack stand position according to aspects of the disclosure.
Figure 2:
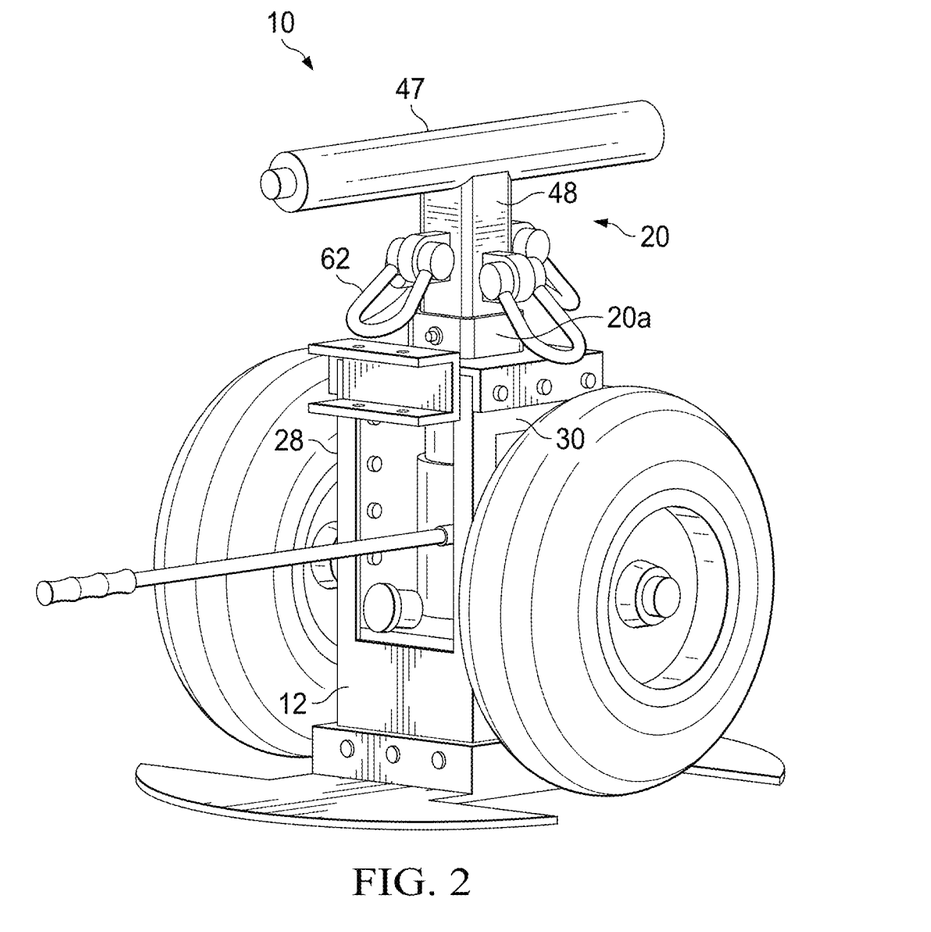
FIG. 2 is another view of an exemplary transport jack operable in a ground handling wheel position and a jack stand position according to aspects of the disclosure.
Figure 3:
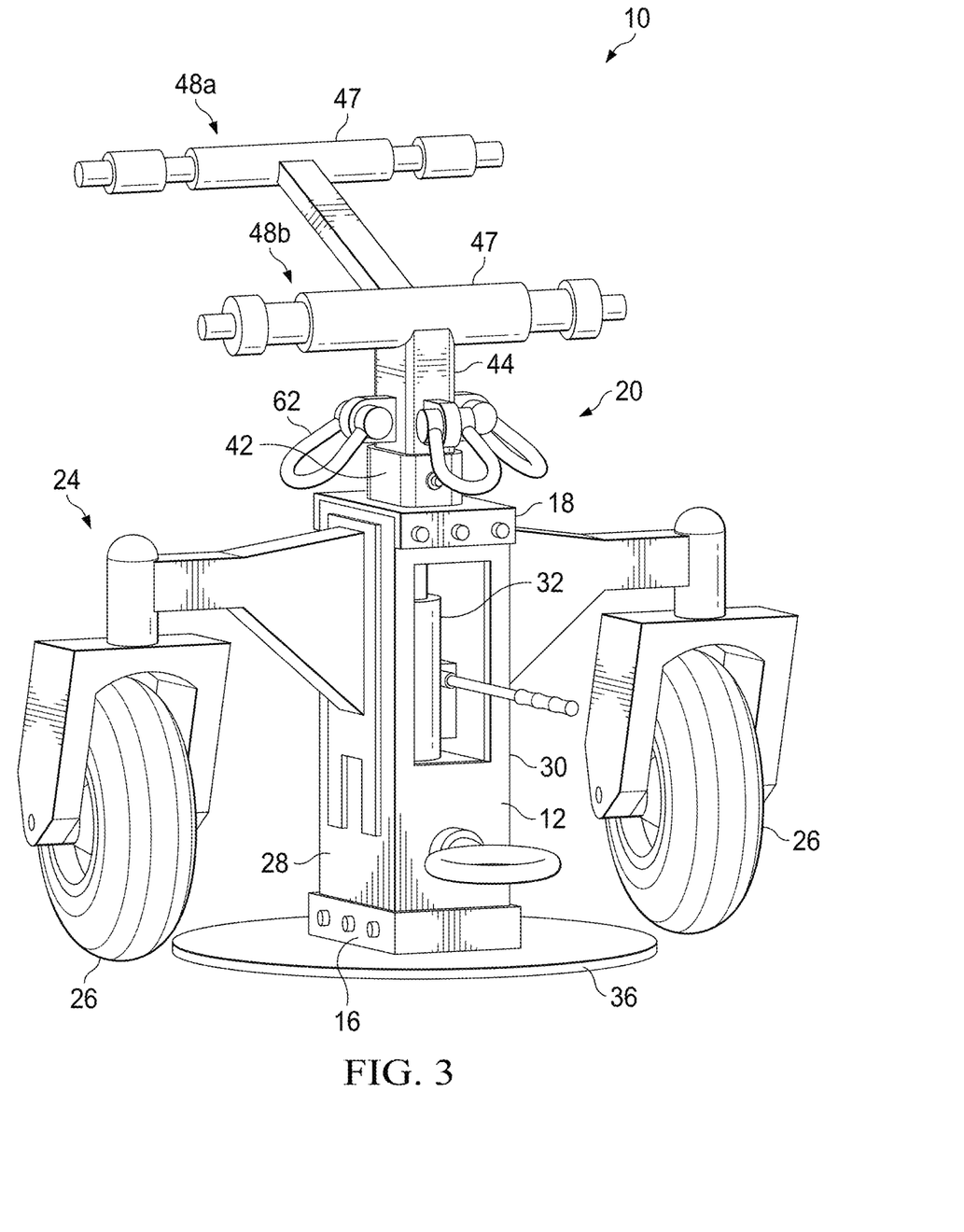
FIG. 3 is an additional view of an exemplary transport jack operable in a ground handling wheel position and a jack stand position according to aspects of the disclosure.

FIGS. 1-3 illustrate exemplary aircraft transport jacks 10 from different perspectives. Transport jack 10 is operable to be secured to an aircraft and to operate in a first position as ground handling wheels and in a second position as jack stand to support the aircraft above the ground. In a non-limiting example, transport jack 10 can be utilized to maneuver an aircraft when loading and unloading the aircraft in a transit process and to support vertically support the aircraft during air, land, and marine transit. Transport jack 10 can be utilized in many different circumstances ranging from routine ground handling, to transit operations, to temporary replacement of damaged landing gears, and for aircraft repair.

Transport jack 10 includes a housing or vertical structure 12 with a vertical axis 14, a bottom end 16, and a top end 18. Vertical structure 12 may have different shapes including being cylindrical or generally rectangular as illustrated in FIG. 1. Transport jack 10 includes an connector 20 operable to secure transport jack 10 to aircraft through an aircraft member 22 at a location above bottom end 16 enabling transport jack 10 to operate in a ground handling wheel position and in a jack stand position. In some embodiments, aircraft member 22 is positioned on or proximate to the aircraft fuselage.

A wheel assembly 24 includes at least two wheels 26 positioned on opposing sides 28, 30 of vertical structure 12. Wheel assembly 24 may take various forms as will be understood by those skilled in the art with reference to this disclosure. An actuator 32 is coupled to vertical structure 12 and wheel assembly 24 and operable to move wheel assembly 24 axially (axial path 40) relative to vertical structure 12 between a lowered or ground handling wheel position and a raised or jack stand position. In the lowered or ground handling wheel position, wheels 26 are on the ground 34 and bottom end 16 is raised above ground 34 permitting the transport jack and supported aircraft to be moved along the ground. In the raised or jack support position, bottom end 16 of vertical structure 12 is on the ground with wheels 26 raised above the ground. Actuator 32 may be a manually or electrically operated device. In the illustrated example, actuator 32 is a manually operated cylinder illustrated by handle 32a.

In some embodiments, bottom end 16 includes a footing 36 to increase the ground engaging surface area of the vertical structure. Footing 36 extends outward from vertical structure 12. Footing 36 may be include one or more footing sections or members. For example, in FIG. 1, footing 36 includes two footing sections 36a, 36b, for example metal plates, that are separated by a gap 38 located in the axial path 40 of wheels 26.

Connector 20 may take various configurations to attach to various aircraft components. An exemplary transport jack 10 is configured as a universal transport jack that can be used with various aircraft and attached at various attachment locations. For example, with reference to FIG. 1, connector 20 includes a first connector 42 and a second connector 44. First connector 42 is located on vertical structure 12 and is operable to removably hold second connector 44, which is configured to attach directly to aircraft member 22. For example, first connector 42 is a socket in which a portion of second connector 44 can be disposed and secured. Accordingly, second connector 44 can be configured for specific aircraft and for specific aircraft attachment locations.

Transport jack 10 can be used with different aircraft and different aircraft attachment locations by changing the specific type of connector 20. Connector 20 may be operable for example to secure vertical structure 12 to a landing gear, including skid and wheeled landing gears. Several non-limiting examples of aircraft connectors are illustrated. In FIG. 1, connector 20 includes a clamp 46 that is configured to be secured to an aircraft member 22 such as a skid landing gear. FIG. 2 illustrates connector 20 having a bracket 20a. Bracket 20a may have a T-shaped section 48 to secure to a landing gear attachment location. FIG. 3 illustrates connector 20 having a first and second T-shaped bracket or section 48a, 48b. T-shaped brackets or sections 48 include a lateral rod 47 that may extend in the direction intersecting opposing sides 28, 30 or perpendicular to the direction intersecting opposing sides 28, 30. As will understood by those skilled in the art with reference to this disclosure, vertical structure 12 and connector 20 form a rigid structure to statically support the aircraft.

Figure 4:
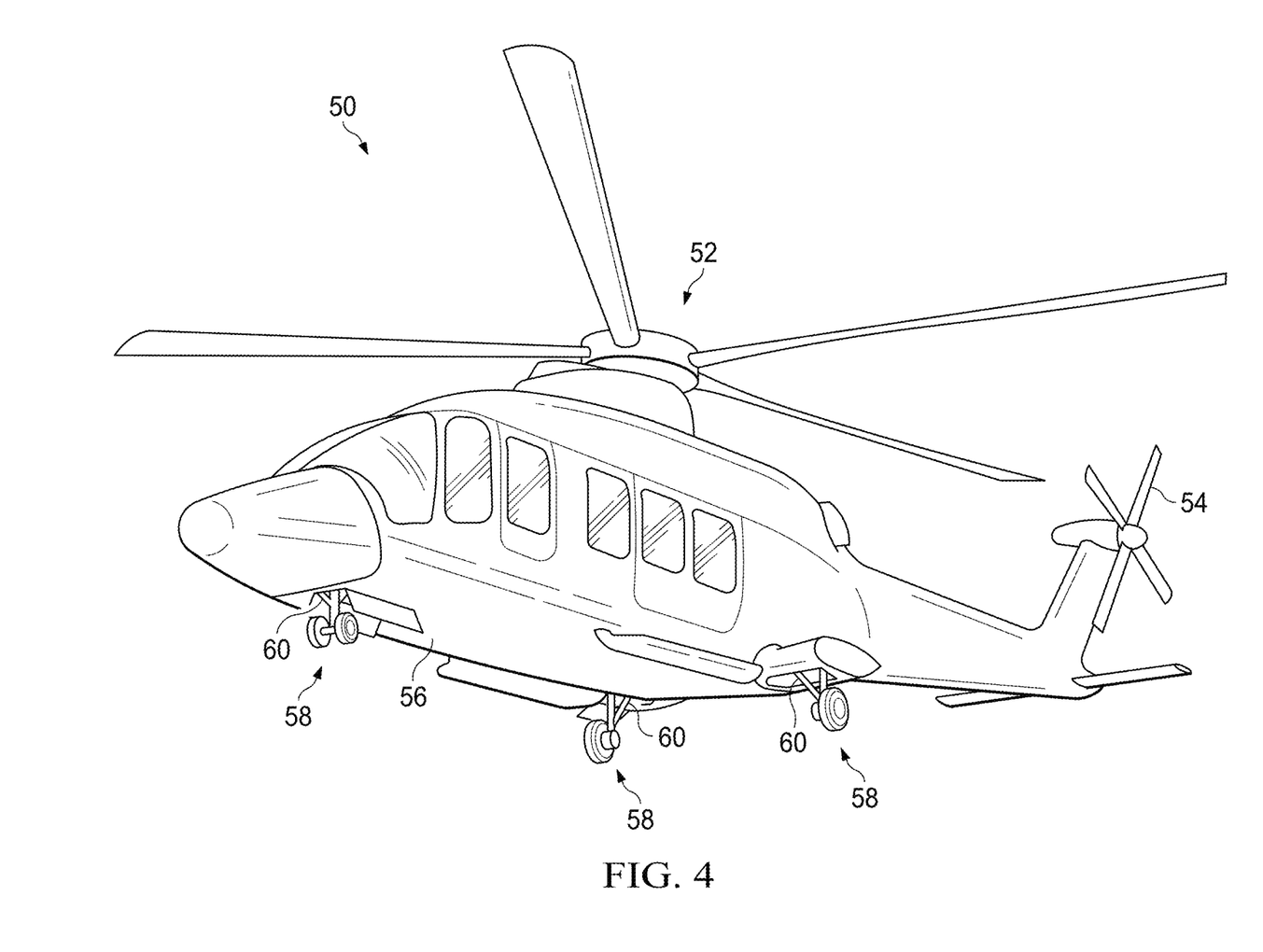
FIG. 4 illustrates an exemplary aircraft that may utilize transport jacks according to aspects of the disclosure.
Figure 5:
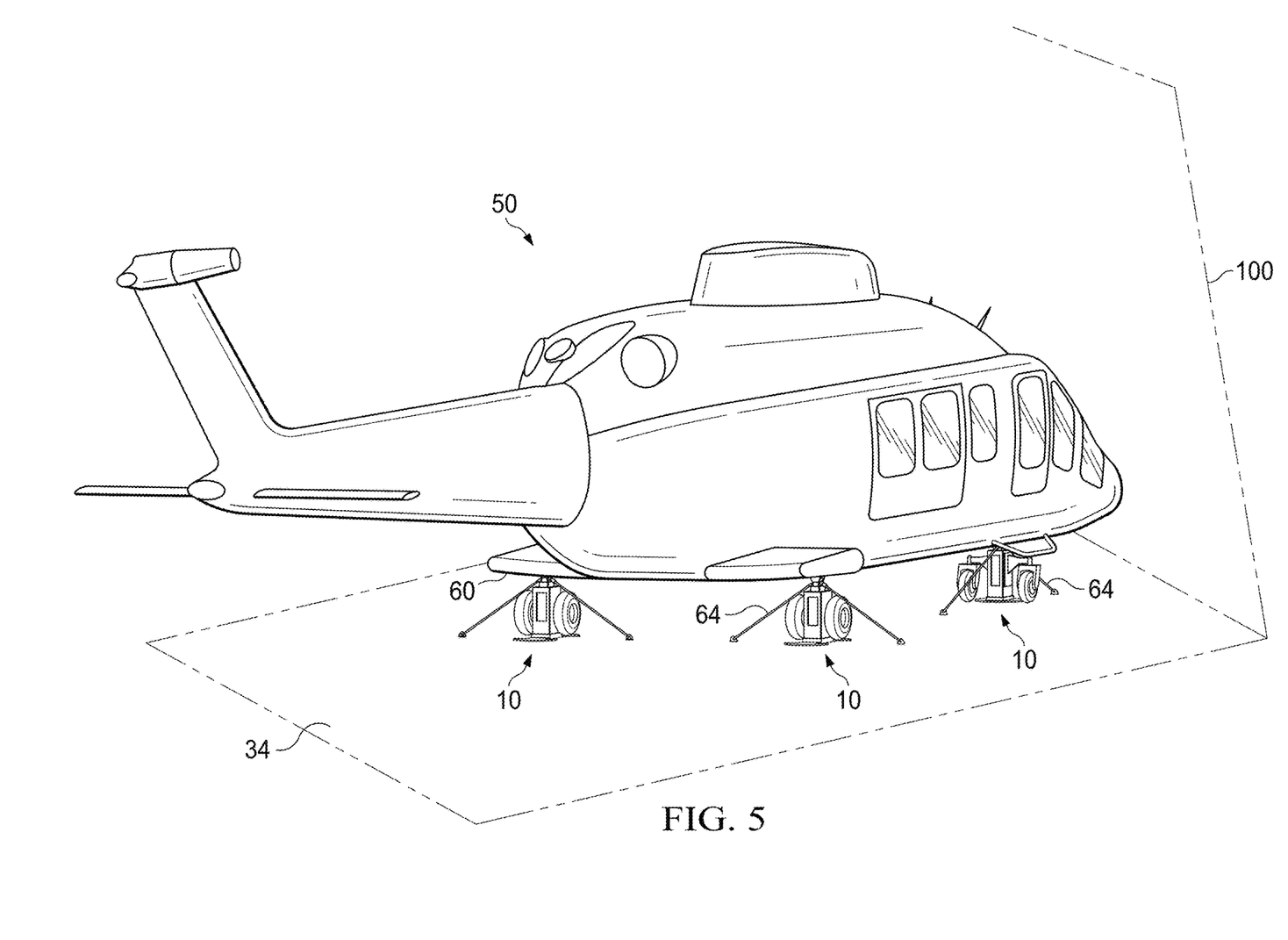
FIG. 5 illustrates an exemplary aircraft utilizing transport jacks for transit of the aircraft according to aspects of the disclosure.

FIGS. 4 and 5 illustrate an exemplary aircraft 50 implementing transport jacks 10. Aircraft 50 is shown as a helicopter, for example a Bell 525, having a main rotor 52, tail rotor 54, fuselage 56 and wheeled landing gears 58. Wheeled landing gears 58 are attached to aircraft 50 at landing gear attachments 60.

FIG. 5 illustrates aircraft 50 prepared for transit for example by air transport 100. The rotor blades and wheeled landing gears 58 have been removed and transport jacks 10 have been attached at landing gear attachments 60. Transport jacks 10 provide mobility during the load and unload process. Different configurations of transport jacks 10 can be used at different locations on aircraft 50. Connector 20 may be different between the nose gear attachment and the main gear attachments such as illustrated by exemplary transport jacks 10 illustrated in FIGS. 2 and 3. The connector may be different both in the configuration to cooperate with the aircraft attachment member and with regard to the vertical height of connector 20.

Aircraft 50 can be moved into transport vessel 100, e.g. air transport, with transport jacks 10 in the lowered, ground handling wheel position. Once located in the cargo area, transport jacks 10 can be actuated into the jack stand position with bottom end 16 on the ground (cargo deck), wheels 26 located above the ground, and the weight of the aircraft supported by vertical structure 12. In the jack stand position, aircraft 50 cannot roll and it is vertically supported in a static position relative to the transport vehicle. Vertical structure 12 and connector 20 provide a rigid stand that can withstand the high transit loads. Transport jack 10 may include tie down attachments 62 (FIGS. 2, 3) providing a location to secure transport jack 10 and aircraft 50 to transport vessel 100 with tie-downs 64.

Figure 6:
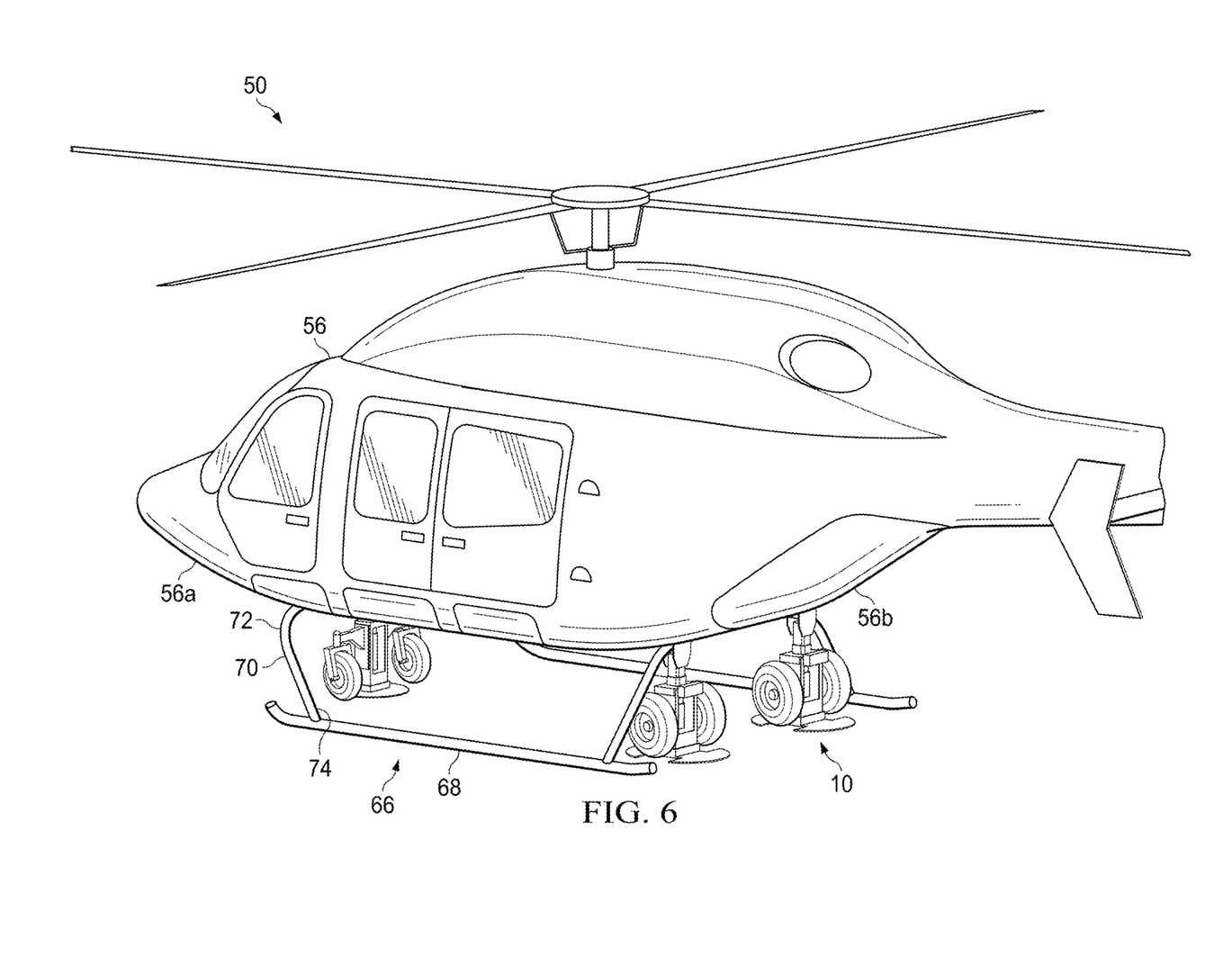
FIG. 6 illustrates an exemplary aircraft with transport jacks secured to skid landing gear adjacent the fuselage according to aspects of the disclosure.
Figure 7:
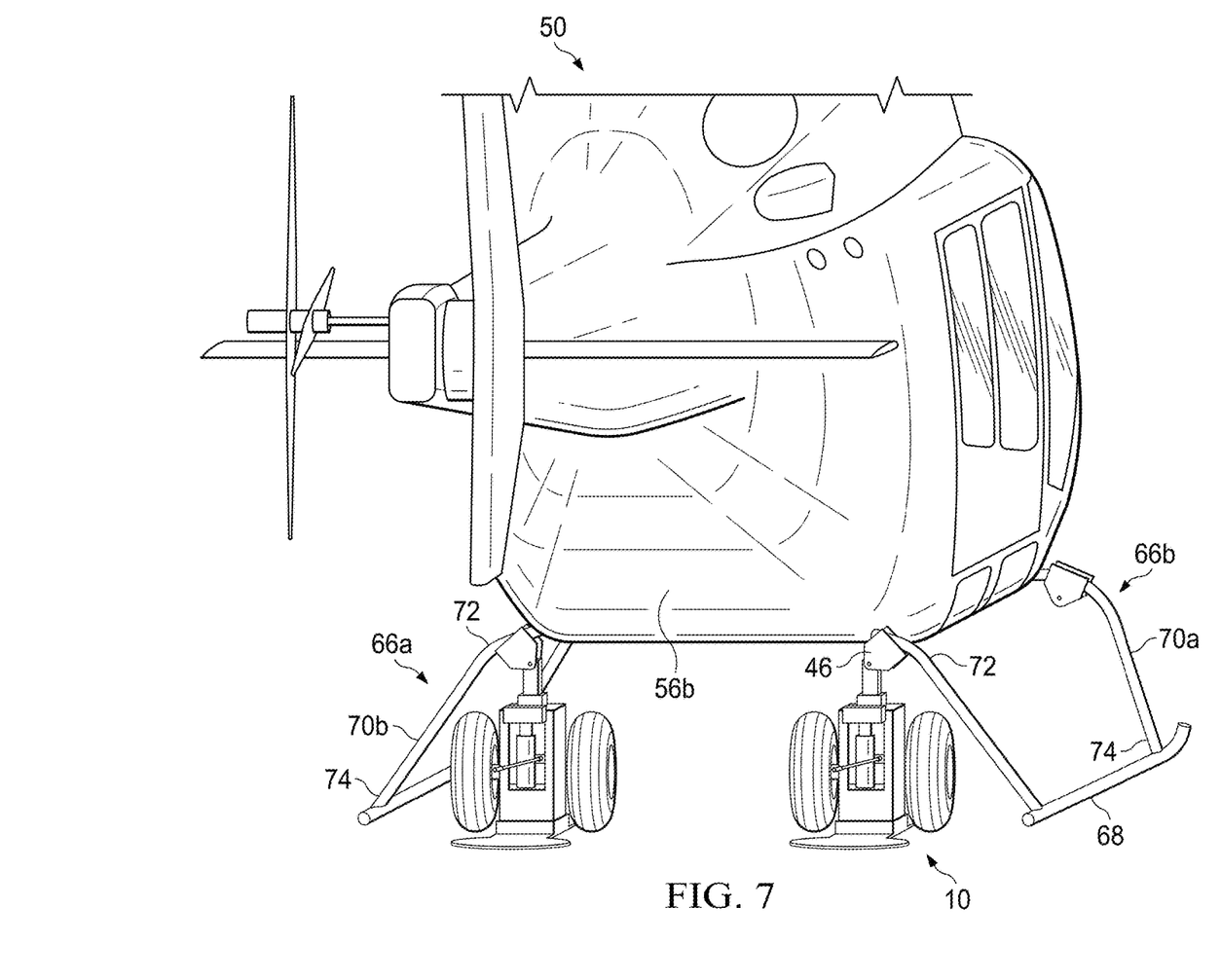
FIG. 7 is an aft view of the aircraft illustrated in FIG. 6.
Figure 8:
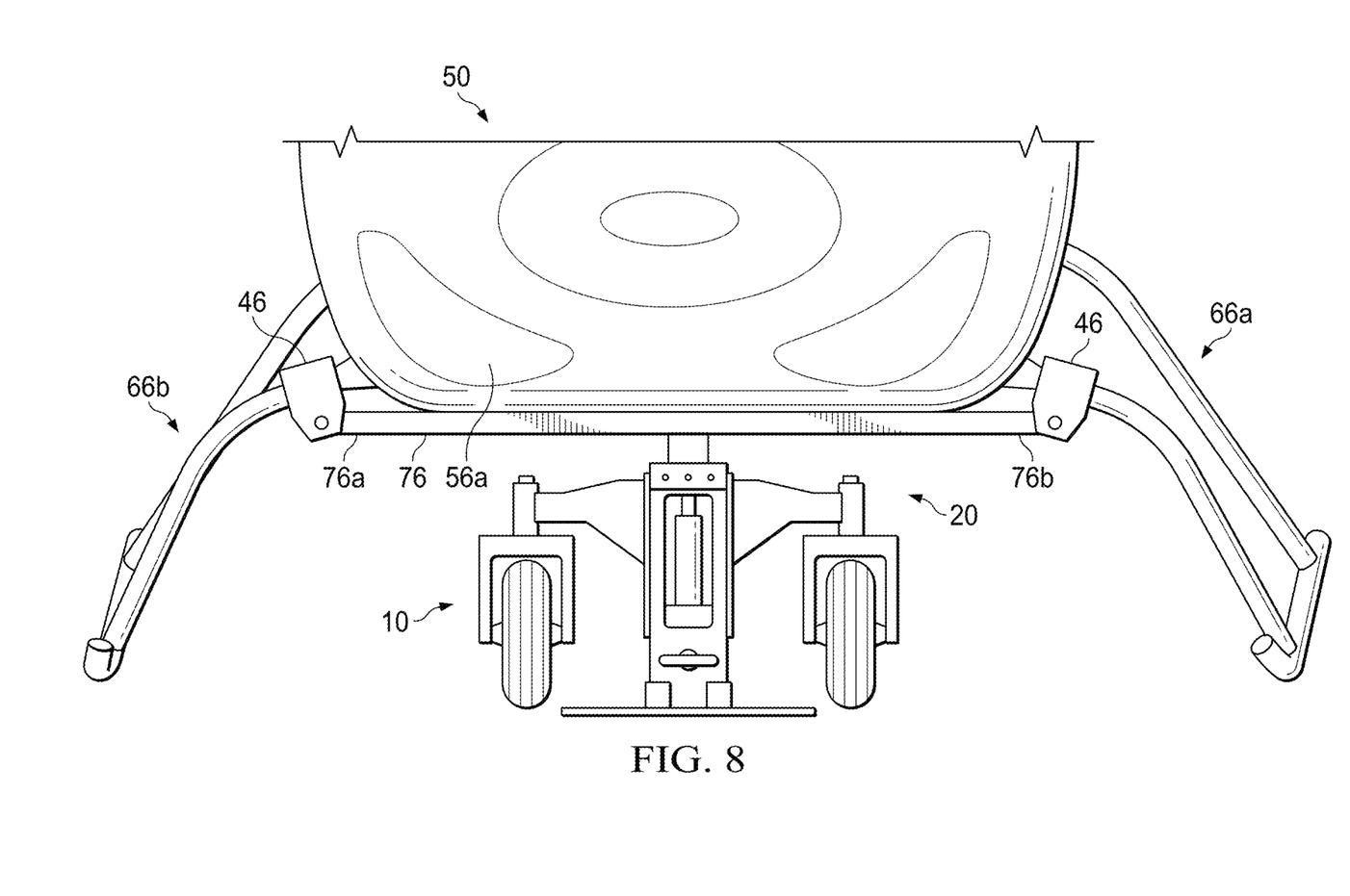
FIG. 8 is a front view of the aircraft illustrated in FIG. 6.

FIG. 6 illustrates transport jacks 10 utilized with an exemplary aircraft 50. FIGS. 7 and 8 are aft and front views of aircraft 50 as arranged in FIG. 6. Aircraft 50 is a helicopter with a skid landing gear 66. Aircraft 50 may be for example a Bell 429. Skid landing gear 66 includes skid rails 68 that rest on the ground and tubes 70 that attach skid rails 68 to fuselage 56 and position skid rails 68 below fuselage 56. In this example, landing gear 66 comprises symmetrical left and right landing gear sections 66a and 66b attached on opposite sides of the fuselage. Each landing gear section 66a, 66b includes a forward leg 70a having a top end 72 attached to fuselage forward end 56a and a second end 74 attach to a skid rail 68 and an aft leg 70b having a top end 72 attached to fuselage aft end 56b and a second end 74 attached to the skid rail.

FIG. 7 illustrates two transport jacks 10 attached to the adjacent aft legs 70b of the left and right landing gear sections 66a, 66b. Each of transport jacks 10 has a clamp 46 that grips a tube 70b securing transport jacks 10 to aircraft 50. In this example, clamps 46 attach proximate top end 72 of tubes 70b.

FIG. 8 illustrates an exemplary transport jack 10 configured to attach to two locations on aircraft 50 centering transport jack 10 between the skids. Connector 20 in this example comprises a beam 76 extending perpendicular to the vertical axis of transport jack 10 with clamps 46 located on opposite ends 76a, 76b. In his example, transport jack 10 is secured to aircraft 50 proximate fuselage 56 at the top ends of the skid landing gear legs.

Figure 9:
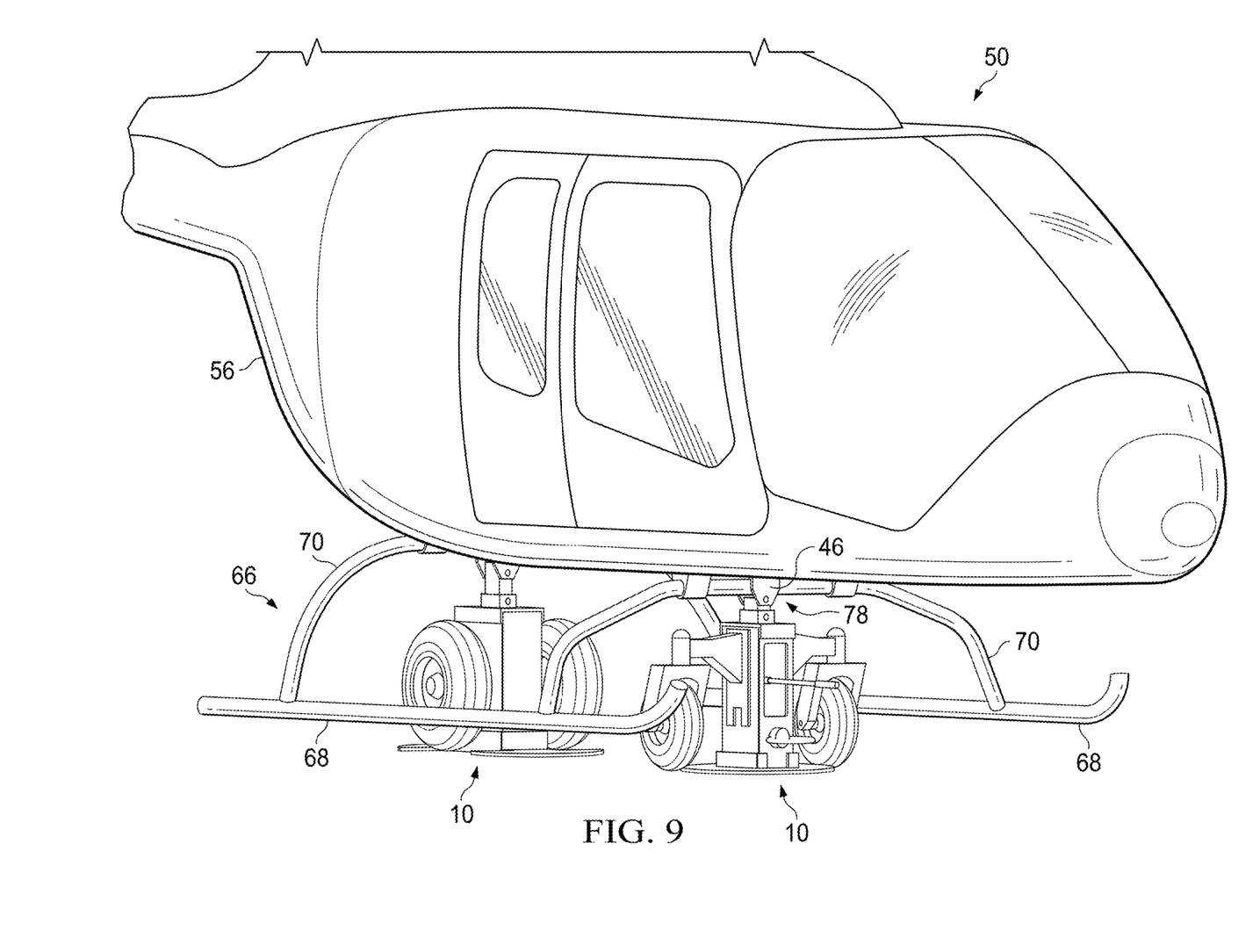
FIG. 9 illustrates another exemplary aircraft with transport jacks secured to skid landing gear adjacent the fuselage according to aspects of the disclosure.

FIG. 9 illustrates another example of transport jacks 10 utilized with an aircraft 50. Aircraft 50 is a helicopter with a skid landing gear 66. Aircraft 50 may be for example a Bell 505. Skid landing gear 66 includes skid rails 68 that are attached to aircraft 50 with U-shaped tubes 70. Transport jack 10 is attached the skid landing gear proximate the mid-point 78 of U-shaped tube 70, proximate the bottom surface of fuselage 56, centering transport jack 10 between left and right skid rails 68. Transport jack 10 may be attached to tube 70 with a connector such as clamp 46 as illustrated for example in FIG. 1.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An aircraft transport jack for attachment to an aircraft, the aircraft transport jack comprising:
    a vertical structure having a vertical axis, a bottom end, and a top end;
    a connector above the bottom end operable to detachably secure the vertical structure to an aircraft member;
    a wheel assembly having a first wheel and a second wheel positioned adjacent to and on opposing sides of the vertical structure and operable to rotate about a common axis; wherein a line passing through a center of each of the first wheel and the second wheel passes through a projection of the vertical structure perpendicular to the vertical axis; and
    an actuator coupled to the vertical structure and the wheel assembly and operable to move the wheel assembly axially relative to the vertical structure between a lowered position in which only the first wheel and the second wheel of the aircraft transport jack contact a surface supporting the aircraft transport jack and a raised position in which the bottom end on the surface and the first wheel and the second wheel are located above the surface.

2. The aircraft transport jack of claim 1, wherein the connector comprises a bracket and the aircraft member is a wheeled landing gear attachment.

3. The aircraft transport jack of claim 1, wherein the connector comprises a rigid T-shaped bracket.

4. The aircraft transport jack of claim 1, wherein the connector comprises a first T-shaped section and a second T-shaped section.

5. The aircraft transport jack of claim 1, wherein the connector comprises a clamp operable to attach to a skid landing gear.

6. The aircraft transport jack of claim 1, wherein the connector comprises a beam extending generally perpendicular to the vertical axis; and
    first and second clamps located proximate opposite ends of the beam.

7. The aircraft transport jack of claim 1, wherein the connector comprises a first connector located on the vertical structure and operable to removably hold a second connector that is operable to attach directly to the aircraft member.

8. The aircraft transport jack of claim 1, wherein the bottom end comprises a footing extending radially outward from the vertical structure.

9. The aircraft transport jack of claim 8, wherein the footing comprises a first section and a second section separated by a gap located in an axial path of the first wheel and the second wheel.

* * * * *